July 15, 1952     E. H. RUSTIN     2,603,228
UNIVERSAL INSTRUMENT AND BEARING CLEANER
Filed Oct. 8, 1945     5 Sheets-Sheet 4
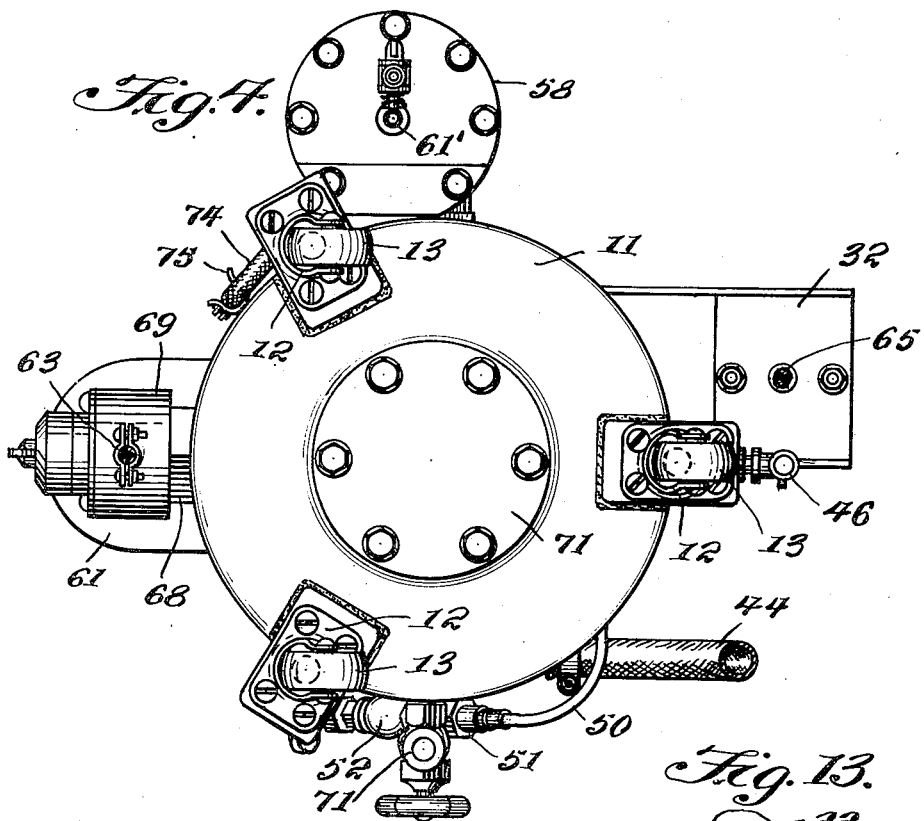
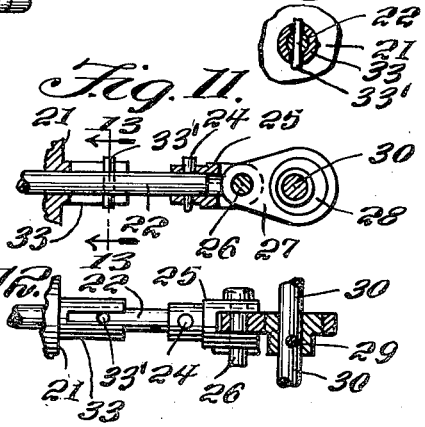
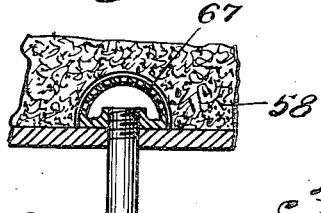
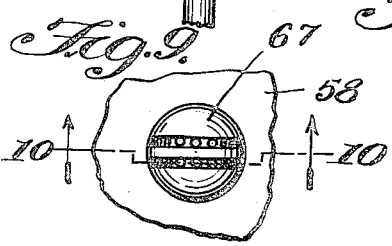
INVENTOR.
Eugene H. Rustin,
BY Victor J. Evans & Co.
ATTORNEYS

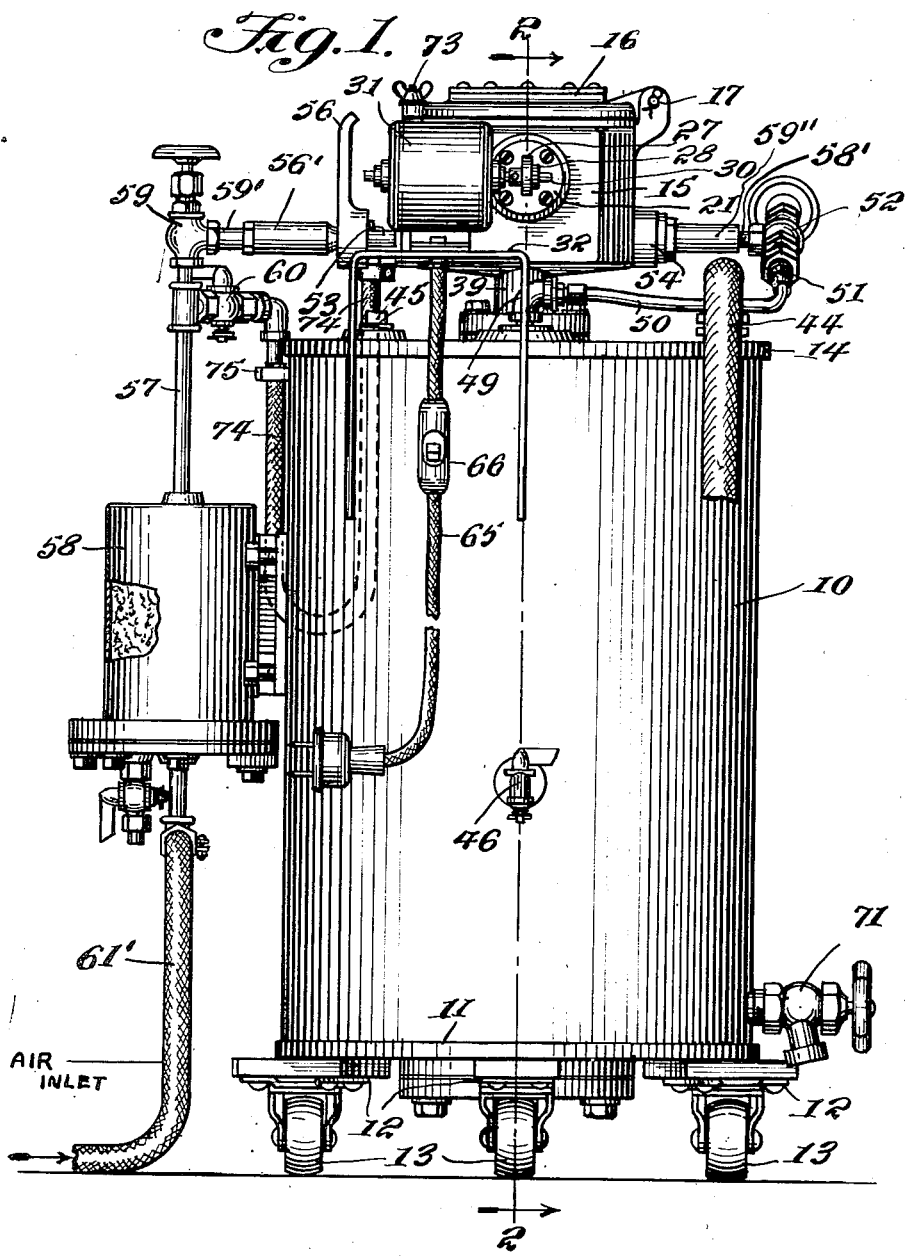

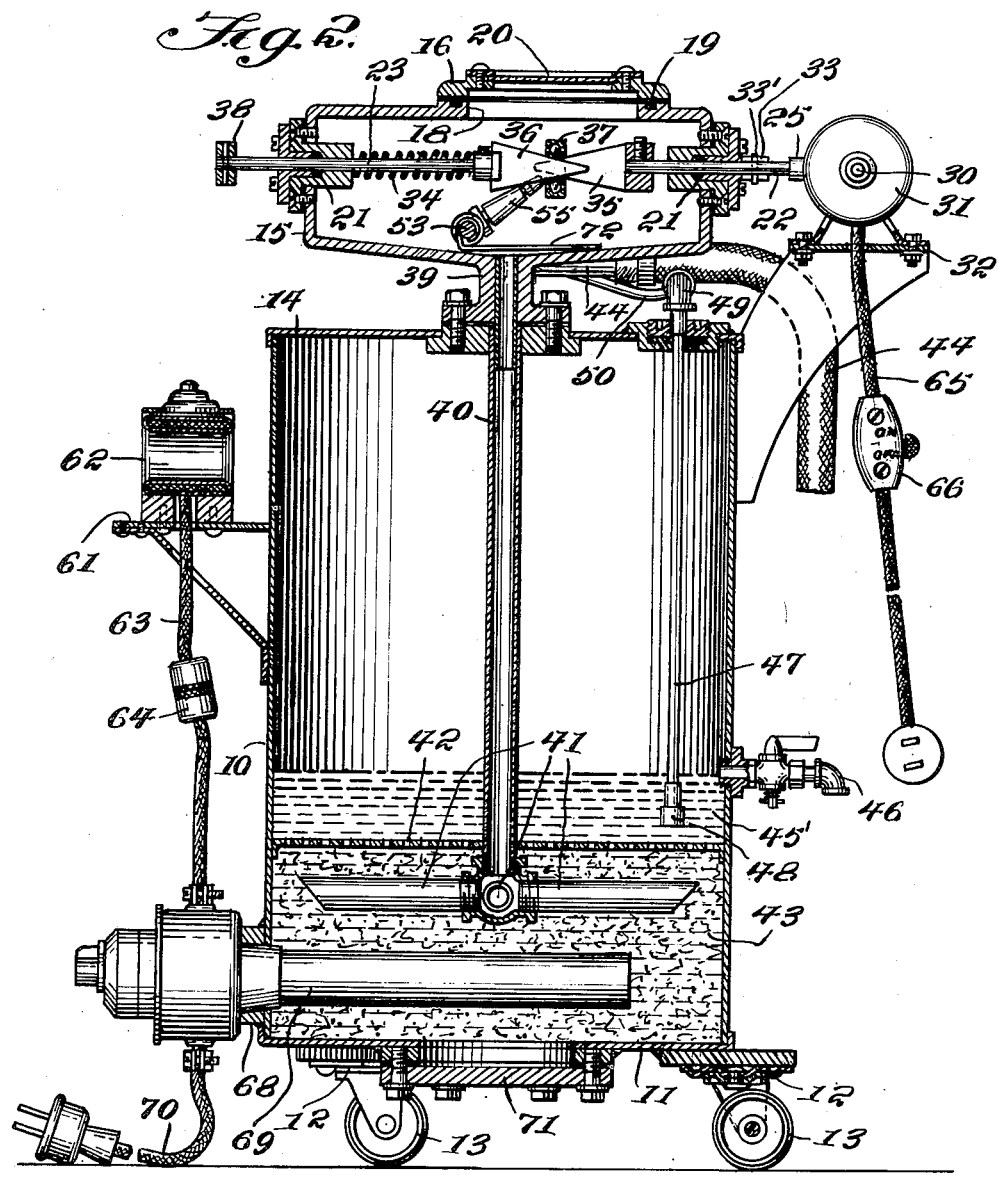

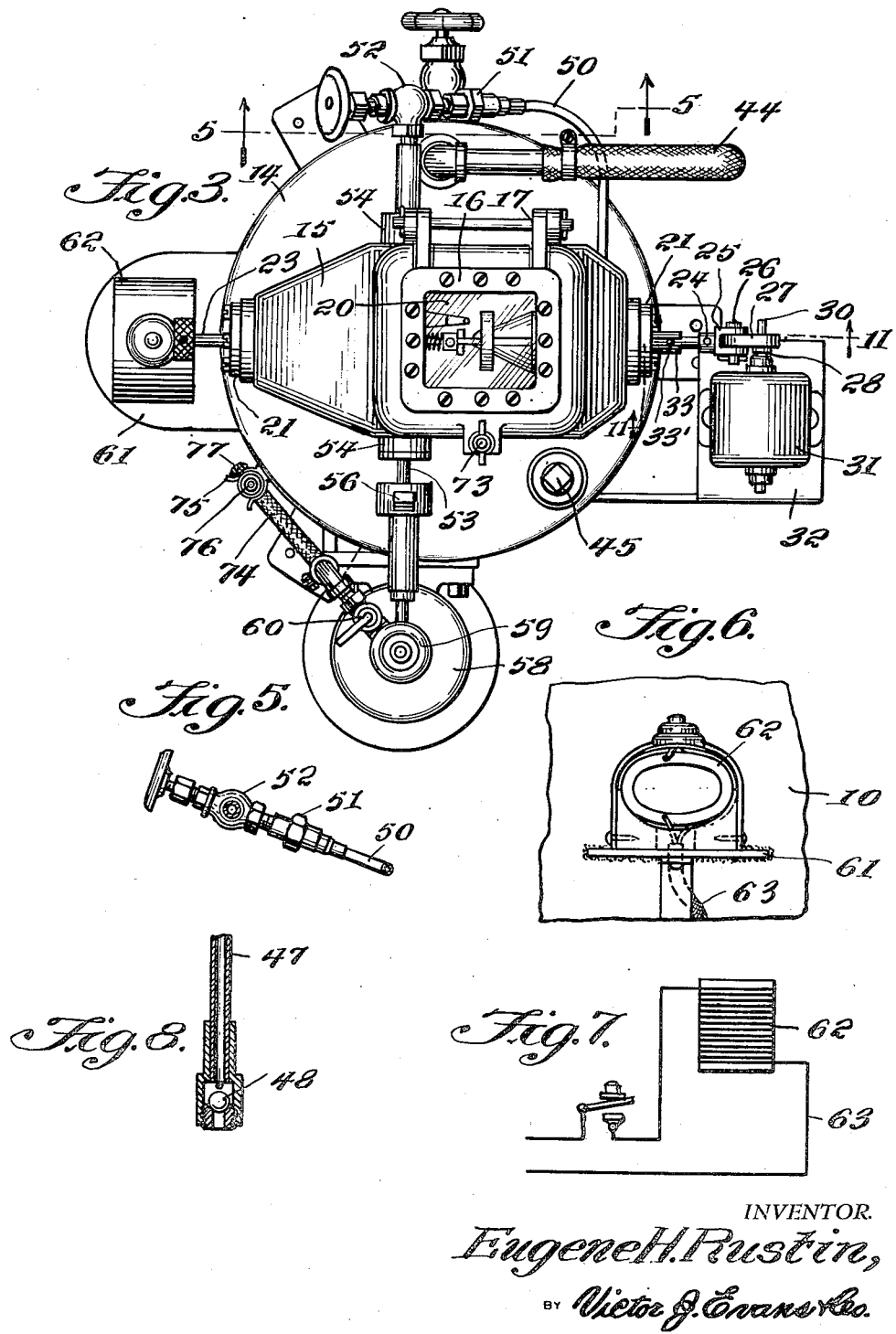

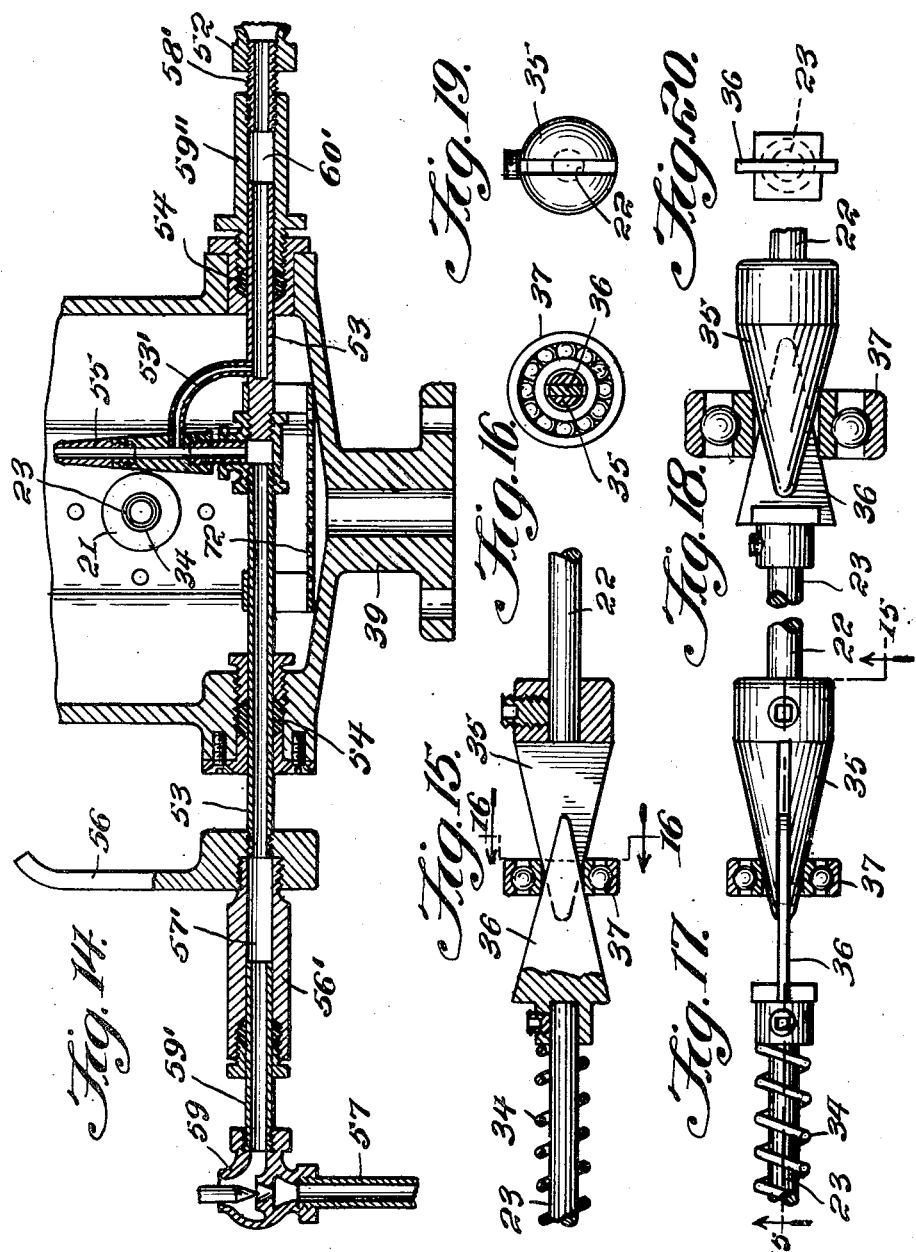

Patented July 15, 1952

2,603,228

UNITED STATES PATENT OFFICE 2,603,228

UNIVERSAL INSTRUMENT AND BEARING CLEANER

Eugene H. Rustin, Brooklyn, N. Y.

Application October 8, 1945, Serial No. 621,005

2 Claims. (Cl. 134—101)

The invention relates to an electro-mechanically operated cleaning apparatus, and more especially to a universal instrument and bearing cleaner.

The primary object of the invention is the provision of a machine of this character, wherein caged roller or ball bearings can be thoroughly cleaned automatically with ease and dispatch for removal therefrom gummy or thickened sediment or other deposits, detrimental to the wearing quality or damaging the same while in service, the machine being of novel construction and unique in the arrangement of its set-up, whereby as a unit it can be moved from one locality to another without undue exertion on the part of the user thereof.

Another object of the invention is the provision of a machine of this character, wherein bearings to be cleaned thereby can be readily and easily placed therein, so as to undergo a thorough cleaning, and thereafter such bearings are removed with ease and dispatch, the cleaning operation being carried forth with rapidity and such operation is entirely automatic.

A further object of the invention is the provision of a machine of this character, wherein a warm oil vapor gas is generated under pressure and this gas penetrates through the bearing while in motion, thus insuring a thorough cleaning job to such bearing in the working of the said machine.

A still further object of the invention is the provision of a machine of this character, which is simple in construction, thoroughly reliable and efficient in operation, strong, durable, light in weight, small in size, portable, compact, readily and easily handled for the cleaning operation, economical to operate, and inexpensive to manufacture and install.

With these and other objects in view, the invention consists in the features of construction, combination and arrangement of parts as will be hereinafter more fully described, illustrated in the accompanying drawings, which show the preferred embodiment of the said invention, and hereinafter set forth by the appended claims.

In the accompanying drawings—

Figure 1 is a side elevation of the machine constructed in accordance with the invention.

Figure 2 is a section view taken on the line 2—2 of Figure 1 looking in the direction of the arrows.

Figure 3 is a top plan view.

Figure 4 is a bottom plan view.

Figure 5 is a sectional view taken on the line 5—5 of Figure 3 looking in the direction of the arrows.

Figure 6 is a fragmentary end elevation showing the demagnetizer of the machine.

Figure 7 is a diagrammatic detail view of the electric circuit thereto.

Figure 8 is a fragmentary vertical sectional view through the lower end of the cleaner fluid lift tube.

Figure 9 is a fragmentary plan view of the filter strainer.

Figure 10 is a sectional view taken on the line 10—10 of Figure 9 looking in the direction of the arrows.

Figure 11 is a sectional view taken on the line 11—11 of Figure 3 looking in the direction of the arrows.

Figure 12 is a plan view, partly broken away, of the parts shown in Figure 11.

Figure 13 is a sectional view taken on the line 13—13 of Figure 11 looking in the direction of the arrows.

Figure 14 is a fragmentary detail section view of the oil and air inlet means and the cleaning chamber.

Figure 15 is a fragmentary sectional view taken on the line 15—15 of Figure 17.

Figure 16 is a sectional view taken on the line 16—16 of Figure 15 looking in the direction of the arrows.

Figure 17 is a plan view of the parts shown in Figure 15.

Figure 18 is a fragmentary side view on an enlarged scale of the parts shown in Figure 17.

Figure 19 is an end view of one of the vibrator heads for holding a bearing, and Figure 20 is a view similar to Figure 19 showing the other vibrator head companion to that shown in said Figure 19.

Similar reference characters indicate corresponding parts throughout the several views in the drawings.

Referring to the drawings in detail, the cleaner machine constructed in accordance with the invention and, in its entirety, comprises a cleaning fluid tank 10, which is a vertically disposed cylindrical body having peripherally at its bottom 11 caster bearings 12 with swivel roller casters 13, so that the tank can be rolled from one locality to another at the option of a user of the machine.

The tank 10 above the top 14 thereof carries an elongated, reversely end tapered cleaning dome 15, provided with a glass paneled vertically swingable cover or closure door 16, which is connected to the top of the said dome by hinges 17, and on the opening of this cover or door, access can be had to the interior of the dome through a doorway 18, normally closed thereby, the cover or door being sealed by a gasket 19, counter-seated in the doorway framing, as best seen in Figure 2 of the drawings, so as to render the interior of the said dome fluid-tight when the machine is operating. The panel 20 of this cover or door is also seal-tight.

At opposite ends of the dome 15 in longitudinal alignment following the central axis of the same are adjustable packing glands 21, through one of which works a vibrator stem 22, while through the other works a follower stem 23, the former being detachably wedge keyed at 24 to a coupling 25, pivotally connected by a cotter pin 26 to an eccentric strap 27, engaged about an eccentric 28, splined at 29 to a power shaft 30, of a vibrator motor 31, of the electric type, and stationarily mounted on a support or shelf 32 built on the tank 10, as best seen in Figures 1 to 4, inclusive of the drawings.

The stem 22 is connected by means of a pin 33' and a slidable coupling 33 to the gland 21 next thereto, and in this manner is held against rotation. The stem 23 is acted upon by a tensioning spring 34, and both stems at their approaching ends within the dome 15 have separably interfitting substantially cone-shaped and substantially arrow-shaped interchangeable and removable clutching heads 35 and 36 respectively, which in detail are clearly shown in Figures 15 to 20 inclusive, of the drawings for the gripping and holding of a caged bearing 37 as illustrated in Figures 15 to 18 inclusive. The stem 23 at the outer exposed end without the dome 15 is provided with a hand grip or knob 38, so that the heads can be separated from each other to clamp the bearing 37 or unclamp the same, as should be obvious. These heads 35 and 36 when interfitted with each other clamp the bearing for maximum exposure thereof within the dome 15 for cleaning operation of the machine.

The dome 15 is joined with the top of the tank 10 by a fluid discharge throat 39, which serves also as a pedestal and from this throat depends within the tank a discharge tube 40, having the radially spoke-like arranged discharge nipples 41 at the lowermost end thereof and above the bottom of the said tank. Above the lay of the nipples 41 within the tank 10 is a reticulated strainer 42, while between the latter and the bottom 11 of such tank is a filling of filtering material 43, in which the nipples are embedded.

The tank 10 is provided with a hot air outlet 44, which enters the same through the top 14 to one side of such tank, located on the top on the opposite side from the outlet 44 is the cleaning fluid filler inlet 45, and a determined level of the cleaning fluid 45' therein is maintained by a hand-operated valved draw-off cock 46 at the side wall of the tank 10. Extending upwardly and vertically from the tank 10 through the top 14 thereof is a fluid lift pipe 47, which at the submerged lower end within the fluid is fitted with a return check valve 48, and at the upper end of such pipe above the top 14 of the tank 10 is a union 49, connecting it to a lead 50 having valved couplings 51, the control valve being indicated at 52, is connected to a horizontally disposed tubular turning and longitudinally slidable feed arbor 53, fitted in packing glands 54, crosswise of the dome 15 in which is mounted a vertically swingable spray or jet nozzle 55, which is designed to direct cleaning fluid into the bearing 37 when held by the heads 35 and 36, for the cleaning thereof and the nozzle 55 is connected to the arbor by means of a pipe 53'. The arbor 53 is turned or moved longitudinally by a hand bar or crank 56 threadably secured thereon and conveniently located and exposed for manual actuation, as best seen in Figures 1, 3 and 14 of the drawings. This arbor 53 also supplies the nozzle 55 with air under pressure from a supply pipe 57, which involves a filter 58 for air cleaning purposes to which is connected the air inlet pipe 61', the filter being fixedly mounted upon the tank 10, as appears in Figure 1. Also the pipe 57 is fitted with a pressure control valve 59, and additionally a cut-off valve 60, respectively both being hand operated.

The valve 59 has an inlet pipe 59' slidably received in the packing gland 56' which is threadably connected to the crank 56. Thus the cavity 57' in the gland 56' intermediate the arbor 53 and pipe 59' permits longitudinal sliding movement of the end of the arbor as desired and a nipple 58' connects the valve 52 to one of the packing glands 54 by means of a sleeve 59' in which the opposite end of the arbor 53 is slidably mounted and a cavity 60' intermediate the arbor 53 and nipple 58' permits longitudinal movement of this end of the arbor as desired.

On a shelf 61 at one side of the tank 10 exteriorly thereof is demagnetizer 62, having an electric extension cord 63, provided with a separable joint 64, the motor 31 being also provided with an electric extension cord 65, having a snap cut-off switch 66, and by these cords electric current supply will be had to the respective motor and demagnetizer, as should be apparent on plugging in such cords to the electric current source.

Intercepting the air supply to the filter 58 is a spreader 67, which is for spraying the air within the said filter.

Projected into the tank 10 from a mounting 68 thereon, is an electric heater 69, which is well within the filter 43, the heater being of the electric thermostatic type, and includes the electric extension cord 70, for current supply thereto. The purpose of the heater 69 is to heat the cleaning fluid from low to various temperatures as desired.

It should be apparent that the used cleaning fluid returns from the dome 15 into the tank 10, so that the same under re-conditioning thereof is used over and over again in the machine and a valve 70' located at the bottom of the tank permits the cleaning fluid to be drawn from the tank when desired.

The bottom 11 of the tank is provided with a manhole cover 71, giving access to the filling in the lower portion of such tank 10 and also to the latter.

The throat 39 is covered by a strainer 72, and the cover or door 16 is releasably held closed by a latch 73, of any approved kind.

Connected to the cut-off valve 60 is a flexible pipe 74 which may be retained in suspended position on the tank, by means of the U-clip 75 the pipe 74 is provided with a nozzle 76 retained thereon by the clamp 77. When air is emitted from the nozzle 76 it is directed on the bearing 37 for the cleaning and drying thereon.

To prepare the machine for operation, the tank 10 is filled up to a determined level with the best grade of cleaning fluid then air within the tank is exhausted therefrom above such level, and the electric heater 69 is turned on to heat the fluid to approximately 140 degrees upward to 170 degrees F., or medium temperature as desired. To reclaim bearings which have been in use a long time, it is best to wash the bearings in kerosene oil before being put in the reclaiming machine. This helps to remove the hard grease from the bearing. Whereas, in cleaning new bearings, no kerosene oil will be used.

The ball bearing to be cleaned must be demagnetized due to the fact that a ball bearing generates a magnetic field and therefore making the chips, dirt, etc. adhere to the ball's inner and outer races. When you demagnetize the ball bearings, the dirt and chips, etc. are freed to come out when placed in the dome 15. A second feature in demagnetizing the ball bearings is that a neutral piece of metal will wear longer than one that is held back by magnetic forces.

It is essential that the tank be filled with the proper oil and that it is thoroughly heated. Thus, the first step in the operation is to place the bearings on the demagnetizer at one side of such bearing and thereafter reverse the bearing on such demagnetizer. The final step is to place the bearing taken from the demagnetizer on the vibrator cone head within the dome 15, then close the door securely, turning on the vibrator mechanism, and effecting a hot spray of oil gas under high pressure through the bearing while vibrating. The gas is now turned off and the bearing is sprayed with air for the drying and spinning thereof. This insures a clean bearing with a light oil film for protection against rust. Thereafter, the vibrator and air are turned off and the bearing cleaned is removed from the machine, for further operations of the latter in cleaning placed bearings therein.

It is believed that the operation and construction of the device will be apparent to those skilled in the art and it is to be understood that changes may be made in the details of construction, arrangement and combination of parts, providing they fall within the spirit of the invention and the scope of the appended claims.

What is claimed is:
1. A machine of the kind described, comprising a cleaning fluid containing a tank, a cleaning dome mounted on the upper end of the tank, a bearing vibrator mechanism reciprocably mounted in the cleaning dome and adapted to receive a bearing for cleaning purposes, a fluid discharge throat formed on the bottom of the dome, a discharge tube connected to the throat for placing the dome in communication with the tank for delivering spent fluid to the latter, means for supplying fluid to the tank, and fluid directing means including a nozzle means connected with the interior of the tank for directing fluid from the tank in the direction of the vibrator mechanism whereby the bearing carried thereby is subjected to the discharge of fluid from the nozzle, means on the tank and connected to the vibrator mechanism for driving such mechanism, means on the dome and supporting the nozzle means for adjusting the nozzle means relative to the vibrator mechanism and means connected to the vibrator mechanism for the release of a bearing from the vibrator mechanism.

2. A machine as in claim 1 wherein an air supply means for supplying air under pressure to the nozzle means is provided, and regulating devices in the fluid directing means and the air supply means respectively for regulating the flow through the respective means independently of each other, and filtering means in said respective means.

EUGENE H. RUSTIN.

REFERENCES CITED

The following references are of record in the file of this patent:

UNITED STATES PATENTS

| Number | Name | Date |
|---|---|---|
| 563,601 | Lewis | July 7, 1896 |
| 1,439,823 | Kaufmann | Dec. 26, 1922 |
| 1,604,405 | Fox | Oct. 26, 1926 |
| 1,702,703 | Osborne | Feb. 19, 1929 |
| 1,766,208 | Antiss | June 24, 1930 |
| 1,848,034 | Titus | Mar. 1, 1932 |